(12) United States Patent
Parkinson et al.

(10) Patent No.: US 8,363,025 B2
(45) Date of Patent: Jan. 29, 2013

(54) TOUCH SCREENS

(75) Inventors: Richard Dean Parkinson, Cambridge (GB); Carl Anthony Pickering, Warwickshire (GB); Ian Richard Thorp, Cambridge (GB); Colin John Wilson, Hertfordshire (GB); Peter Robert Thomas, Cotesbach (GB)

(73) Assignee: Jaguar Cars Limited, Coventry (GB)

( * ) Notice: Subject to any disclaimer, the term of this patent is extended or adjusted under 35 U.S.C. 154(b) by 269 days.

(21) Appl. No.: 12/943,168

(22) Filed: Nov. 10, 2010

(65) Prior Publication Data

US 2011/0141041 A1    Jun. 16, 2011

Related U.S. Application Data

(63) Continuation of application No. 10/597,553, filed on Jul. 28, 2006, now Pat. No. 7,852,323.

(30) Foreign Application Priority Data

Jan. 30, 2004    (GB) .................................. 0401991.5

(51) Int. Cl.
    *G06F 3/041* (2006.01)
    *G06F 3/045* (2006.01)
    *G09F 9/00* (2006.01)
(52) U.S. Cl. ...................... 345/173; 340/461; 178/18.05
(58) Field of Classification Search .................... 345/173
    See application file for complete search history.

(56) References Cited

U.S. PATENT DOCUMENTS

| | | | |
|---|---|---|---|
| 3,727,181 A | 4/1973 | Robbins et al. | |
| 4,435,616 A * | 3/1984 | Kley | 178/18.05 |
| 5,549,529 A | 8/1996 | Rasmussen | |
| 5,796,827 A | 8/1998 | Coppersmith et al. | |
| 5,825,345 A * | 10/1998 | Takahama et al. | 345/104 |
| 5,934,367 A | 8/1999 | Shimmura et al. | |
| 6,627,918 B2 | 9/2003 | Getz et al. | |
| 7,545,270 B2 | 6/2009 | Pickering et al. | |
| 2002/0185999 A1 | 12/2002 | Tajima et al. | |
| 2003/0098858 A1 | 5/2003 | Perski et al. | |
| 2006/0164230 A1 * | 7/2006 | DeWind et al. | 340/461 |

FOREIGN PATENT DOCUMENTS

| | | |
|---|---|---|
| DE | 4121180 A1 | 1/1993 |
| DE | 4301160 C2 | 7/1994 |
| EP | 1228917 A1 | 8/2002 |
| WO | 0068044 A1 | 11/2000 |
| WO | 2004022388 A1 | 3/2004 |

OTHER PUBLICATIONS

German Patent Office Official Letter for Application No. 11 2004 002 257.6, mailed Jun. 9, 2011, 7 pages.

* cited by examiner

*Primary Examiner* — Sumati Lefkowitz
*Assistant Examiner* — Charles V Hicks
(74) *Attorney, Agent, or Firm* — Brooks Kushman P.C.

(57) ABSTRACT

A touch screen control system comprising a touch screen having first and second conductive layers arranged to be brought together by touching of the screen. A detection system is arranged to detect a contact position at which the screen is touched by monitoring electrical signals from at least one of the layers. The system further comprises an antenna, and the detection system includes a proximity sensing signal generator arranged to generate a proximity sensing signal to be transmitted between the antenna and the first layer via a user of the system. The detection system is further arranged to receive the transmitted proximity sensing signal and determine therefrom the distance between a part of the user and the touch screen.

20 Claims, 12 Drawing Sheets

TOUCH SCREENS

CROSS-REFERENCE TO RELATED APPLICATIONS

This application is a continuation of U.S. application Ser. No. 10/597,553 filed Jul. 28, 2006. The disclosure of which is incorporated in its entirety by reference herein.

TECHNICAL FIELD

This invention relates to touch screens, and has particular application in touch screens arranged for use in the control of vehicle sub-systems.

BACKGROUND

It is known to provide touch screens in vehicles to allow the driver or passenger to control various sub-systems of the vehicle. It is also known to provide proximity sensing systems in which a signal is transmitted through the driver or passenger, for example between an antenna in their seat and a control input such as a push button or touch screen, and the strength of the received signal measured. The strength of the signal indicates the capacitance between the driver or passenger and the control input, and therefore the distance of the user's hand from the control input. Typically the signal is received at, or transmitted from the control input by means of a specially provided antenna, such as a conductive coating on the push button, or a conductive bezel around the touch screen.

According to the invention, there is provided a touch screen control system comprising a touch screen having first and second conductive layers arranged to be brought together by touching of the screen, and a detection system arranged to detect a contact position at which the screen is touched by monitoring electrical signals from at least one of the layers, wherein the system further comprises an antenna, and the detection system includes a proximity sensing signal generator arranged to generate a proximity sensing signal to be transmitted between the antenna and the first layer via a user of the system, and the detection system is further arranged to receive the transmitted proximity sensing signal and determine therefrom the distance between a part of the user and the touch screen.

The first layer may have two contact elements extending along opposite sides thereof, and the detection system may be arranged to connect the contact elements to different potentials so that the potential of the layer varies with the distance from each of the two contact elements thereby to enable sensing of the contact position. Such an arrangement is consistent with a convenient four-wire touch screen design.

The detection system may be arranged to transmit the proximity sensing signal from the first layer to the antenna, or from the antenna to the first layer. The detection system may be arranged to transmit, or receive, the proximity sensing signal via at least one of the contact elements, and preferably both of the contact elements.

Where the proximity sensing signal is transmitted to the first layer, the detection system preferably includes a summing device arranged to sum signals from the two contact elements to produce a received proximity sensing signal.

The detection system may be arranged to control at least one connection to the second layer such that it acts as a shield for at least part of the time when the proximity sensing signal is being received. For example, the detection system may be arranged to determine when the touch screen is being touched, and to control said at least one connection to connect the second layer to at least one fixed potential when the proximity sensing signal is being received and the touch screen is not being touched.

Conveniently, said at least one connection may comprise the normal connections to the second layer used for touch position sensing. For example they may comprise two connections arranged to connect the second layer between two different potentials, both when the proximity sensing signal is being received and the touch screen is not being touched, and when the detection system is determining the contact position.

The detection system may be arranged to electrically isolate the second layer when the proximity sensing signal is being received and the touch screen is being touched. This avoids potentials on the second layer interfering with the proximity sensing signal received on the first layer.

The detection system may be arranged to alternate between a touch position sensing mode, in which it is arranged to determine the contact position, and a proximity sensing mode, in which it is arranged to measure said distance.

The detection system may comprise a touch screen controller arranged to detect the contact position, and a proximity sensing system including the proximity sensing signal generator. The touch screen controller may then be arranged to receive said electrical signals, including the proximity sensing signal from the touch screen and the proximity sensing system may be arranged to receive the proximity sensing signal from the touch screen controller. The touch screen controller may also be arranged to send a synchronisation signal to the proximity sensing system to enable the proximity sensing system to determine when it is receiving the proximity sensing signal from the touch screen controller.

The present invention further provides a touch screen control system comprising a touch screen having first and second conductive layers arranged to be brought together by touching of the screen, and a detection system arranged to detect a contact position at which the screen is touched by monitoring electrical signals from at least one of the layers, wherein the first layer is arranged to act as a receiving antenna to receive a proximity sensing signal transmitted from a transmitting antenna via a user, and the detection system is further arranged to transmit the received proximity sensing signal on to a proximity sensing system thereby to enable the proximity sensing system to determine a distance between a part of the user and the touch screen.

BRIEF DESCRIPTION OF THE DRAWINGS

Preferred embodiments of the present invention will now be described by way of example only and with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
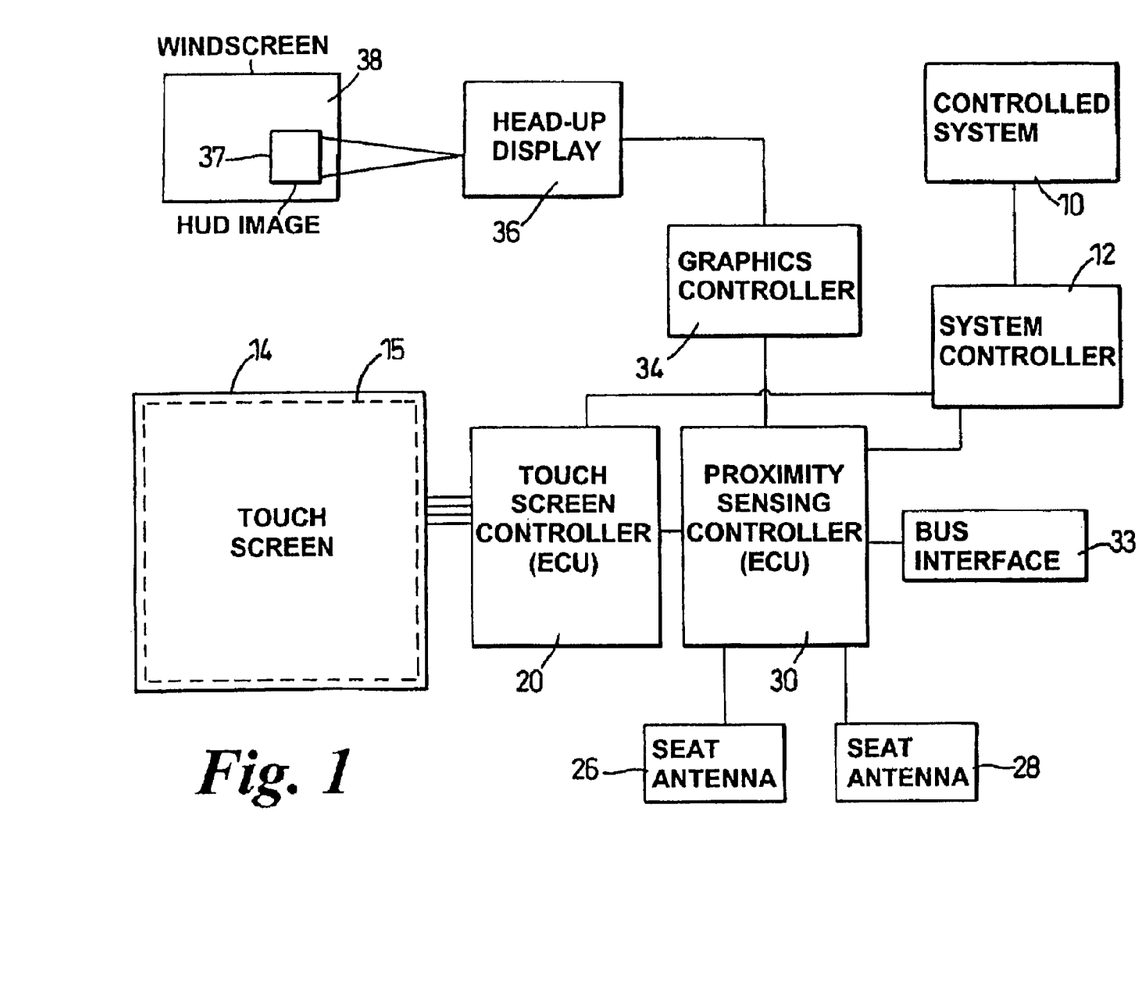
FIG. 1 is a schematic system diagram of a control system according to a first embodiment of the invention.
Figure 2:
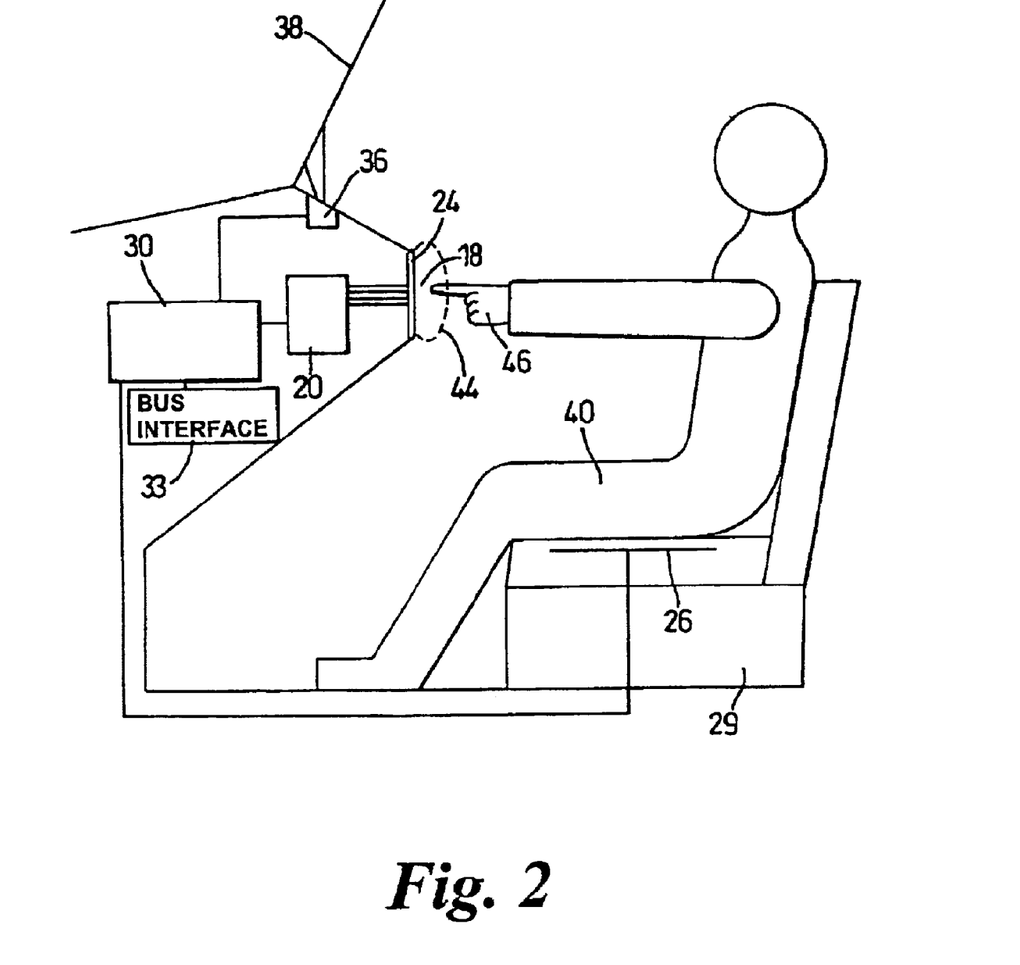
FIG. 2 is a schematic side view of the system of FIG. 1 incorporated in a vehicle.

Referring to FIGS. 1 and 2, a control system for a vehicle subsystem 10, which in this particular embodiment is a heating and ventilating system, comprises a system controller 12 arranged to control operation of the subsystem 10, and a four-wire touch screen control panel 14, which has an LCD display 15 behind it. A touch screen controller 20 controls operation of the touch screen 14 and detects when the touch screen has been touched, and in what position, as will be described below. The touch screen 14 is used to control the operation of the subsystem 10, and the system controller 12 receives input signals from the touch screen controller 20.

A proximity sensing system for detecting when a user's hand is approaching the touch screen 14 includes a driver's seat antenna 26 in the form of a conductive sheet provided in the driver's seat 29. The antenna 26 is connected to a proximity sensing processor or ECU 30, which is arranged to transmit electrical signals through the seat antenna 26 and receive them via the touch screen 14 and the touch screen controller 20, as will be described in detail below. The strength of these signals is used to determine the distance between a part of the driver's body, usually his hand, and the touch screen 14. A similar seat antenna 28 is provided in the front passenger seat of the vehicle.

The proximity sensing ECU 30 is also connected to a graphics controller 34, which in turn is connected to a head-up display unit 36 mounted beneath the vehicle windscreen 38 and arranged to project a display onto the windscreen so that it can be viewed by the driver 40 from the driver's seat 29. The proximity sensing ECU 30 is also connected to a bus interface 33 so that it can use data available on the vehicle CAN bus.

The general operation of the proximity sensing system will now be described. The proximity sensing ECU 30 applies a sinusoidal signal at a predetermined frequency and amplitude, in this case 67 kHz and 10V, to the driver's seat antenna 26, and monitors the signals received from the touch screen via the touch screen controller 20 at that frequency. While the driver 40 is not operating the touch screen 14 provided no part of his body is within a predetermined region 44 close to the touch screen 14, then no signal at 67 kHz will be detected from the touch screen. Under these conditions the head-up display unit 36 is not operated and the controlled system 10 is not altered.

If the driver 40 brings his hand 46 into the region 44 then the signal from the seat antenna 26 will be transmitted through his body to the touch screen where it will be received sufficiently strongly to be detected by the proximity sensing ECU 30. This is because the body of the driver 40 has different dielectric properties from the surrounding air and is better able to transmit the signal from the driver's seat antenna 26 to the touch screen. When the signal is received from the driver's seat antenna 26, the proximity sensing ECU 30 activates the head-up display unit 36 which projects onto the windscreen a HUD image 37 representing the current status of the controlled system. When the driver's hand 46 touches the touch screen 14, this is detected by the touch screen controller 20 and notified to the proximity sensing ECU 30 which modifies the image 37 to indicate to the driver 40 which of the control areas 16 his hand is touching, in this case by highlighting the representation of that control area. The head-up display unit 36 alters the HUD image 37 to indicate to the driver the effect of his inputs to the controlled system. When the driver 40 has altered the controlled system to the desired setting, he withdraws his hand 46. When his hand leaves the region 44, the touch screen 14 ceases to receive the signal from the driver's seat antenna 26, and the proximity sensing ECU 30 detects the removal of the driver's hand. It then deactivates the head-up display unit 36.

In order to distinguish between the driver and the passenger, the proximity sensing system is arranged to transmit the proximity sensing signal alternately through the driver's seat antenna 26 and the passenger's seat antenna 28.

Figure 3:
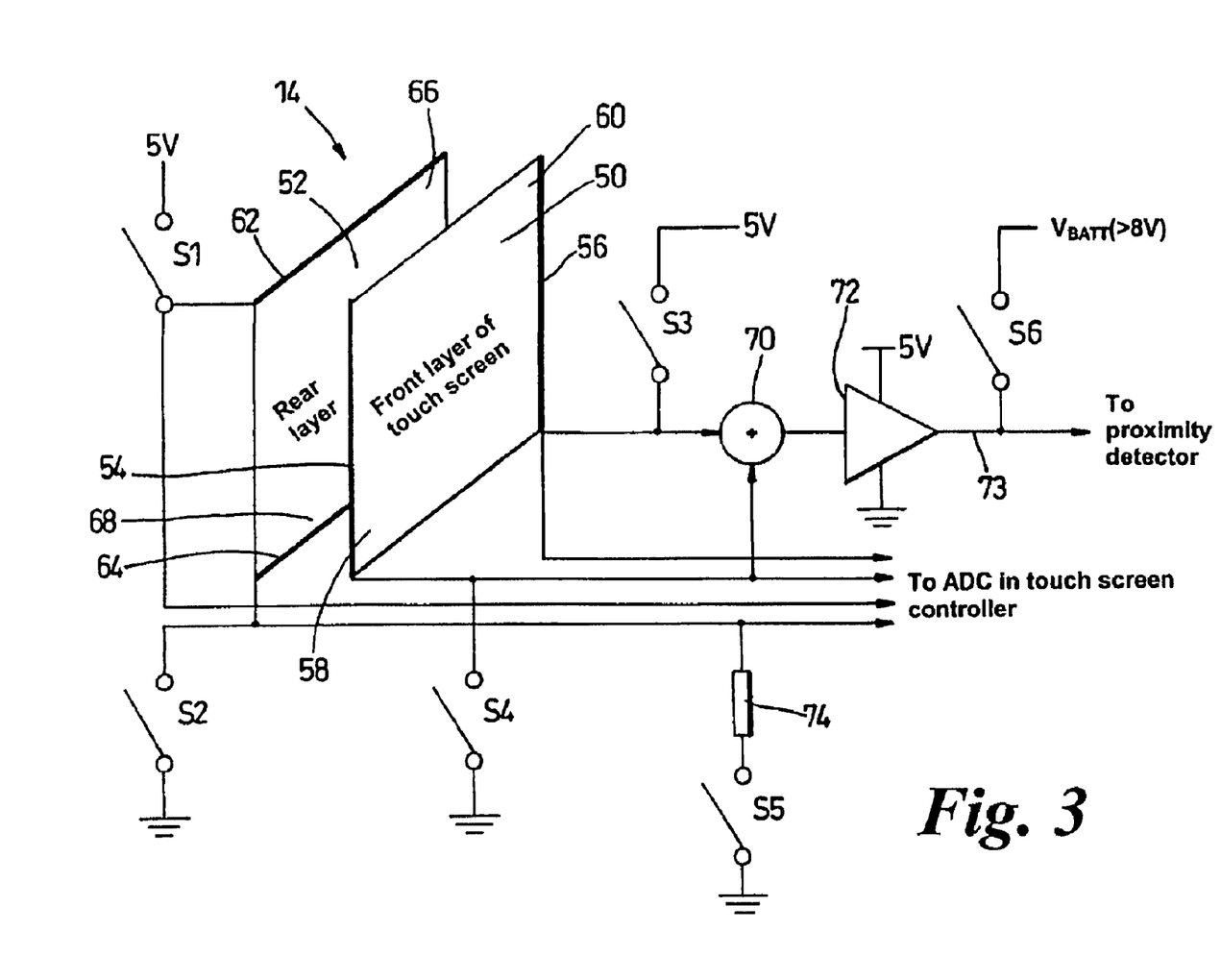
FIG. 3 is a schematic circuit diagram of the system of FIG. 1.

Referring to FIG. 3, the touch screen 14 comprises a front layer 50, which is on the outside of the screen 14 nearest to the driver and passenger, and a rear layer 52 between the front layer 50 and the LCD display 15. The front and rear layers 50, 52 are electrically conductive, parallel to each other and spaced apart so that there is a gap between them. Two contact wires 54, 56 extend along the left and right edges 58, 60 of the front layer 50, and two further contact wires 62, 64 extend along the top and bottom edges 66, 68 of the rear layer 52. Each of the four contact wires 54, 56, 62, 64 is connected individually to an analogue to digital converter (ADC) in the touch screen controller 20, which uses the signals on the contact wires to determine the position of the contact point at which the touch screen is touched. The top and bottom contact wires 62, 64 of the rear layer 52 are also connected to a 5V supply and to ground respectively by switches S1 and S2, and the right and left contact wires 56, 54 of the front layer 50 are also connected to the 5V supply and ground respectively by switches S3 and S4. The left and right contact wires 54, 56 of the front layer 50 are also both connected to a summing circuit 70, the output of which is input to a buffer 72 which has a 5V supply. The output 73 from the buffer 72 is used as an input to the proximity sensing controller which uses it for proximity sensing.

The bottom contact wire 64 on the rear layer 52 is also connected to ground through a resistor 74 and a further switch S5. The output 73 from the buffer 72 is connected via a switch S6 to a battery voltage V.sub.BATT which is greater than 8V. This is used to produce a timing signal to co-ordinate operation of the touch screen controller 20 and the proximity sensing controller 30.

Figure 4:
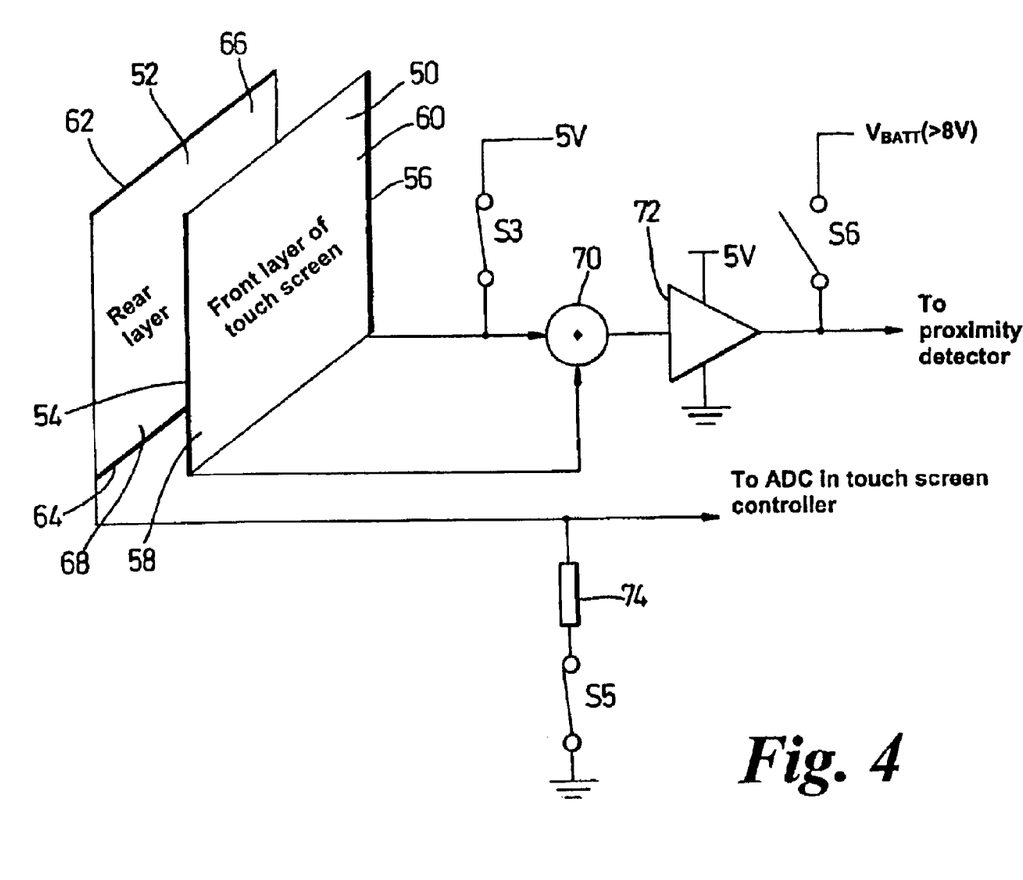
FIG. 4 is a schematic circuit diagram of the system of FIG. 1 arranged to detect touching of its touch screen.

Referring to FIG. 4, in order to determine whether or not the touch screen 14 is being touched, the touch screen switching circuit is put into a touch detection state. In this state the right contact wire 56 of the front layer 50 is connected to the 5V supply by the switch S3 and the left contact wire 54 is disconnected from ground. The whole of the front layer 50 is therefore at approximately 5V. The lower contact wire 64 of the rear layer 52 is connected to ground via the resistor 74 and switch S5, and the upper contact wire 62 is disconnected from the 5V supply. If the screen is not being touched, the voltage of the rear layer 52 remains at zero. However, if the screen is touched so the front layer 50 is moved into contact with the rear layer 52 at any point, the voltage of the rear layer 52 will rise above zero, which can be detected by the touch screen controller 20.

Figure 5:
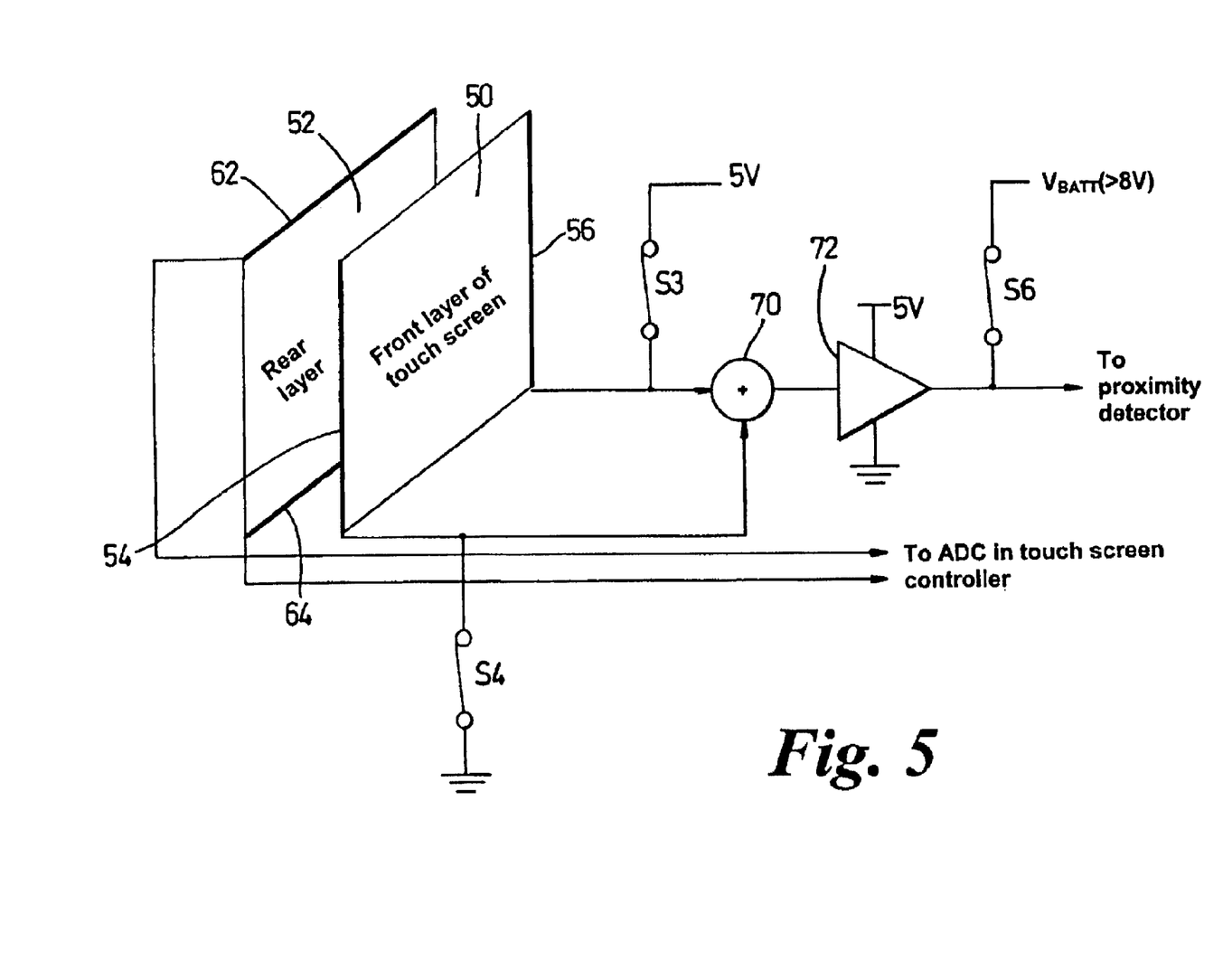
FIG. 5 is a schematic circuit diagram of the system of FIG. 1 arranged to determine an x coordinate of a point of contact on the touch screen.

Referring to FIG. 5, in order to determine the x-coordinate of the position in which the touch screen is being touched, the touch screen switching circuit is put into an x-coordinate sensing state. In this state the right contact wire 56 of the front layer 50 is connected to the 5V supply by the switch S3 and the left contact wire 54 of the front layer 50 is connected to ground by the switch S4. This causes the whole of the right hand side 60 of the front screen to be at 5V, the whole of the left hand side 58 to be at substantially zero volts, and all positions on the front layer 50 to be at a potential which depends on their distance, in the horizontal direction, from each of the two side contact wires 54, 56. The voltage at the top and bottom contact wires 62, 64 is input to the high impedance input of the touch screen controller 20. If the screen is being touched so that the two layers 50, 52 are in contact, then the whole of the rear screen will be brought to the potential of the point of contact on the front screen. This potential is detected by the touch screen controller and indicates the x-coordinate of the point of contact.

Figure 6:
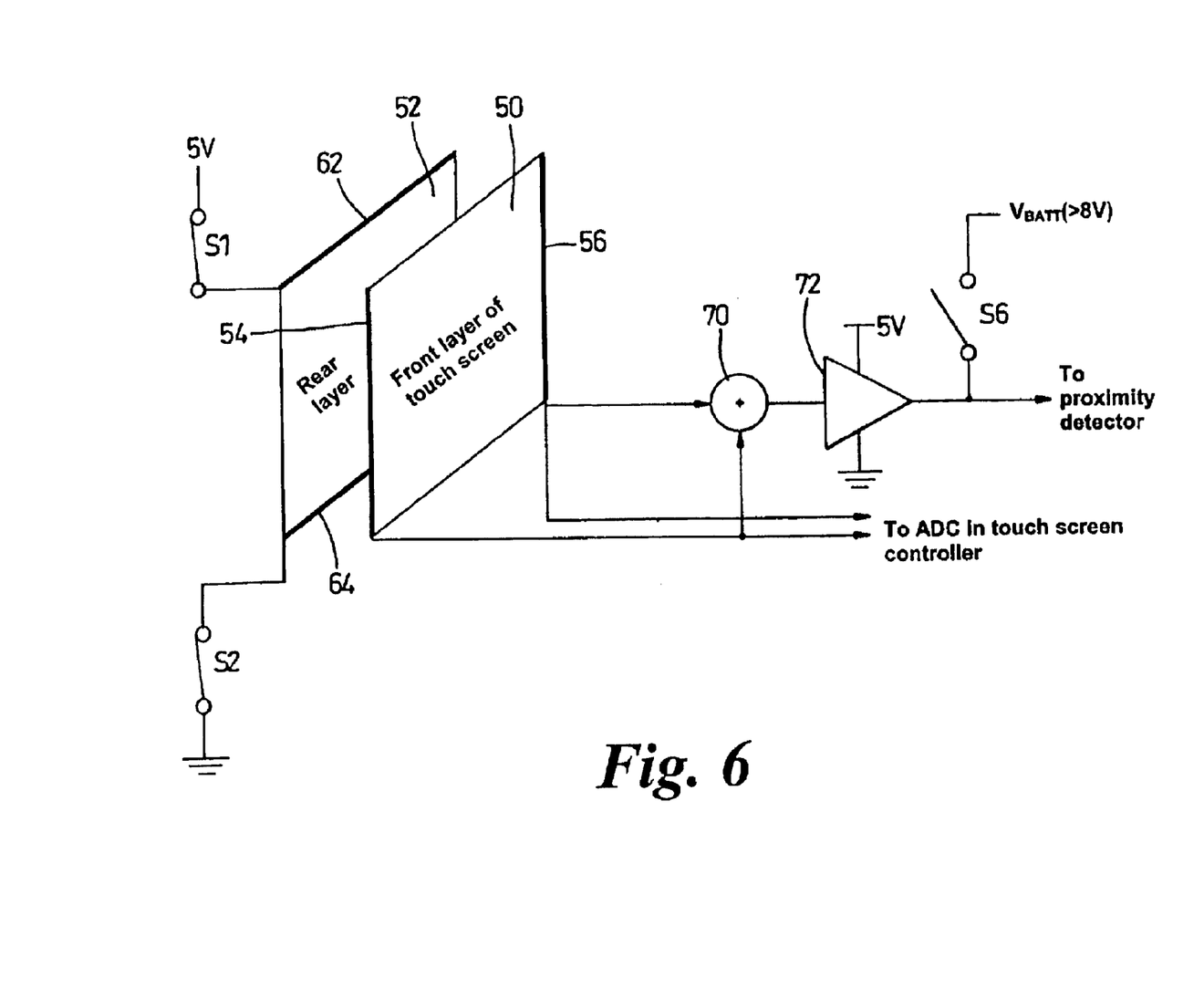
FIG. 6 is a schematic circuit diagram of the system of FIG. 1 arranged to determine a y coordinate of a point of contact on the touch screen.

Referring to FIG. 6, the process for determining the y coordinate corresponds to that for determining the x coordinate. The touch screen switching circuit is put into a y-coordinate sensing state, in which the rear layer 52 is connected to the 5V supply at the top contact wire 62 and to ground at the bottom contact wire 64 so that the potential on the rear layer varies with vertical position. The voltage on the front screen is then monitored using the left and right contact wires 54, 56 to determine the y coordinate of the point of contact.

Figure 7:
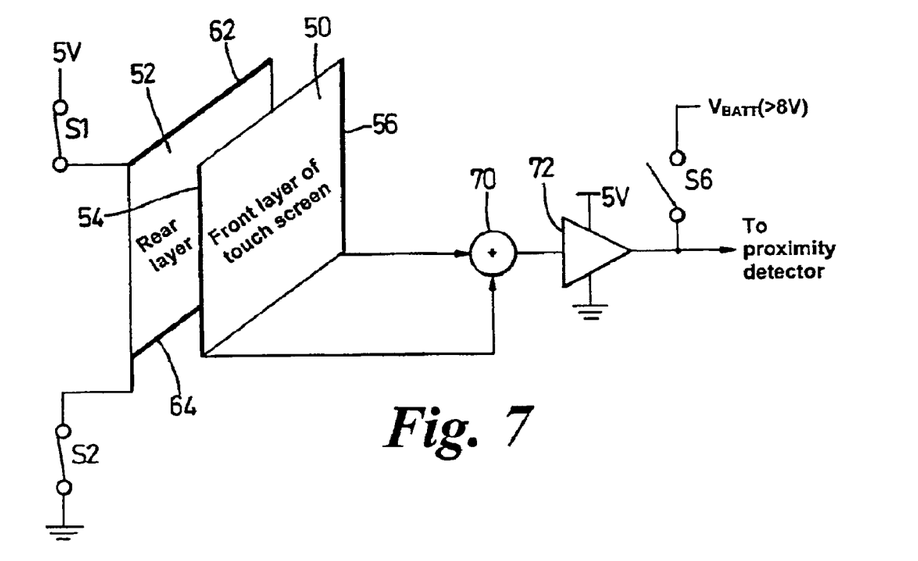
FIG. 7 is a schematic circuit diagram of the system of FIG. 1 arranged for proximity sensing when the touch screen is not being touched.

Referring to FIG. 7, in order to perform the proximity sensing, the front layer 50 of the touch screen 14 is used as a receiver antenna for the proximity sensing signal which is transmitted from the driver or passenger seat antenna 26, 28 through the driver or passenger. As indicated above, the strength of the received signal is indicative of the distance between the hand of the driver or passenger and the touch screen 14. To detect the proximity sensing signal, the output from the buffer 72, is monitored to determine magnitude of its 67 kHz component, which is a measure of the strength of the received proximity sensing signal at the front layer 50.

When the touch screen 14 is not being touched, for the system to perform the proximity sensing function the touch screen switching circuit is put into a first proximity sensing state. In this state the rear layer 52 is used as a shield, to shield the front layer 50 from interference from the LCD 15. In order to perform this function most effectively the rear layer 52 needs to be connected to a low impedance source. The top contact wire 62 is therefore connected to the 5V supply via the switch S1, and the bottom contact wire 64 is connected to ground via the switch S2. For effective shielding, the output impedance of the 5V source and the impedances of the switches S1 and S2 must both be low at 67 kHz. Ideally the effective impedance at 67 kHz between the rear layer 52 and ground should be no more than 100.OMEGA. The effective impedance can be calculated by adding the output impedance of the 5V source to the impedance of S1 and S2 in parallel. The input impedance of the proximity sensing circuit in the proximity sensing ECU 30 is also arranged to be low, in this case approximately 100.OMEGA. at 67 kHz, to minimize the effect of the capacitance between the layers of the touch screen 14.

Figure 8:
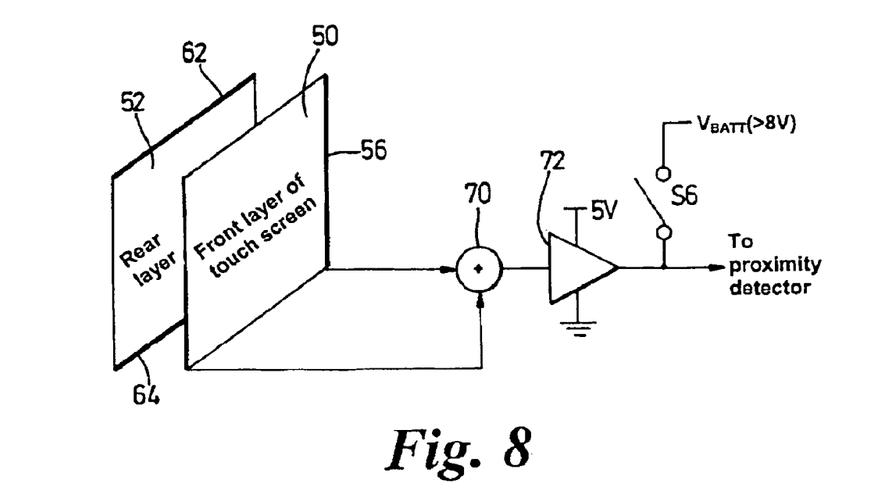
FIG. 8 is a schematic circuit diagram of the system of FIG. 1 arranged for proximity sensing when the touch screen is being touched.

Referring to FIG. 8, the proximity sensing system also needs to function when the screen is being touched. This is so that it can determine which user is touching the screen. This can be achieved, for example, by transmitting different proximity sensing signals through the two seat antennae 26, 28, or by transmitting the signals at different times through the two antennae, in which case the same signal can be used for both users. When the screen 14 is being touched, the rear layer 52 cannot be connected to the 5V supply and ground, as the voltage on the rear layer 52 would then interfere with the received proximity sensing signal on the front layer 50. Therefore in a second proximity sensing state the rear layer is electrically isolated, being disconnected from the 5V supply and from ground by opening the switches S1 and S2. The proximity sensing signal is received on the front layer 50 and measured in the same way as when the screen is not being touched. The isolation of the rear layer 52 prevents it from acting as an effective shield, but because the screen is being touched, the proximity sensing signal is transmitted strongly through the user to the front layer 50, and can therefore easily be detected.

Figure 9:
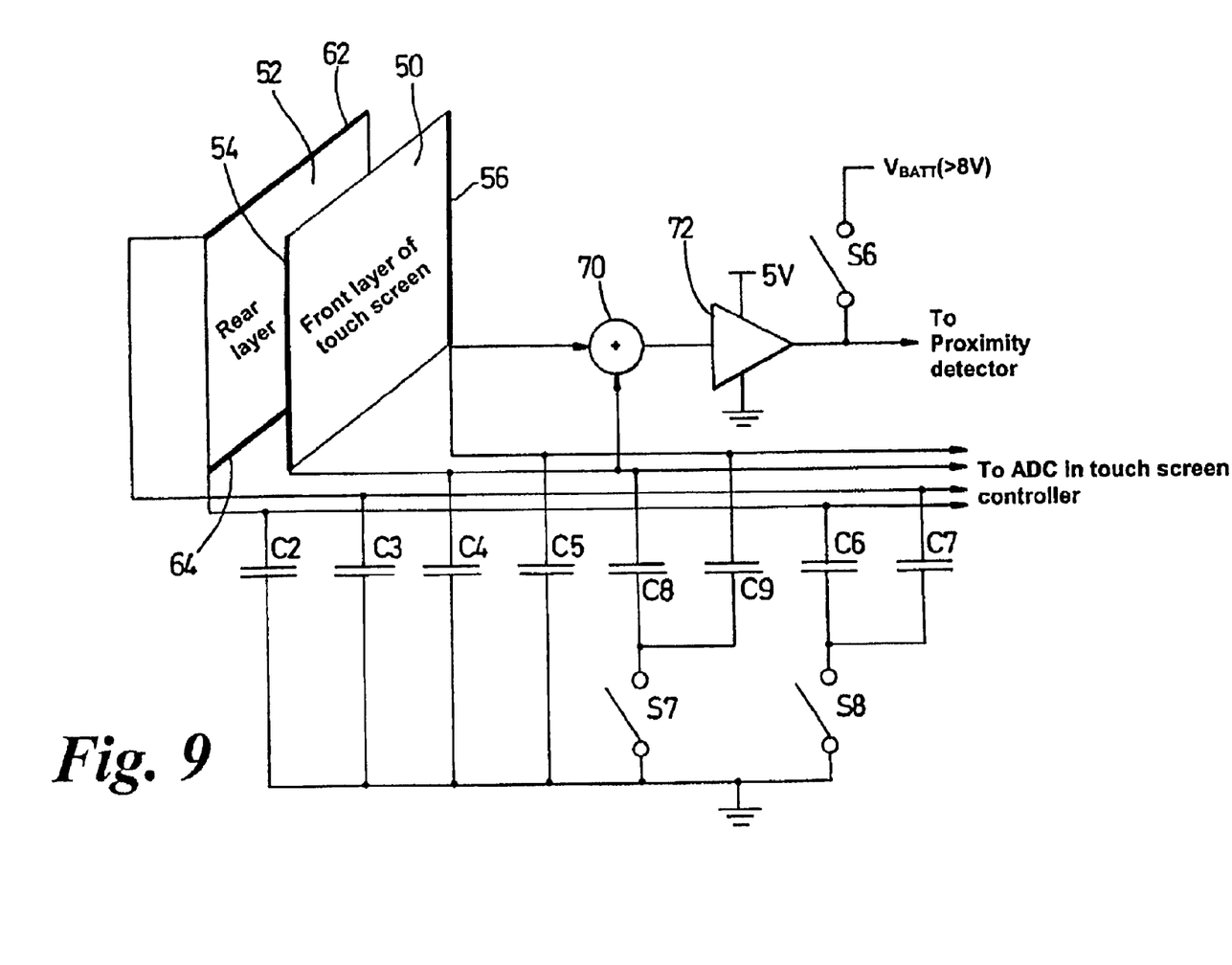
FIG. 9 is a schematic circuit diagram of the system of FIG. 1 showing EMC and ESD protection.

Referring to FIG. 9, a capacitor C8, C9 is connected between ground and each of the left and right contact wires 54, 56 on the front layer 50. Similarly a capacitor C6, C7 is connected between ground and each of the top and bottom contact wires. These capacitors C6, C7, C8, C9 are filtering capacitors for electromagnetic compatibility (EMC), and are used to improve the immunity of the touch screen to interference, in particular from the display 15. The values of these capacitors C6, C7, C8, C9 depend on the resistance of the touch screen 14 and the required measurement time. Typically C8 and C9 will be at least 100 nF, and in this case they are 100 nF. Typically C6 and C7 will be a similar value or lower, and in this case they are also 100 nF. However, the capacitors C8, C9 on the front layer 50 would interfere with detection of the proximity sensing signal, and the capacitors C6, C7 on the rear layer 52 would similarly interfere when the screen is being touched, as they would then provide a path from the front layer 50 to ground. Therefore the capacitors C8, C9 are connected to ground through a further switch S7, so that they can be switched out during proximity sensing, and the capacitors C6, C7 are connected to ground though a further switch S8, so that they can be switched out during proximity sensing when the screen 14 is being touched. Further capacitors of C2, C3, C4, C5 are therefore permanently connected between each of the contact wires 54, 56, 62, 64 and ground. These are of a much lower value, in this case 2.2 nF, and provide a degree of EMC protection during proximity sensing, without significantly interfering with the proximity sensing signal.

Figure 10:
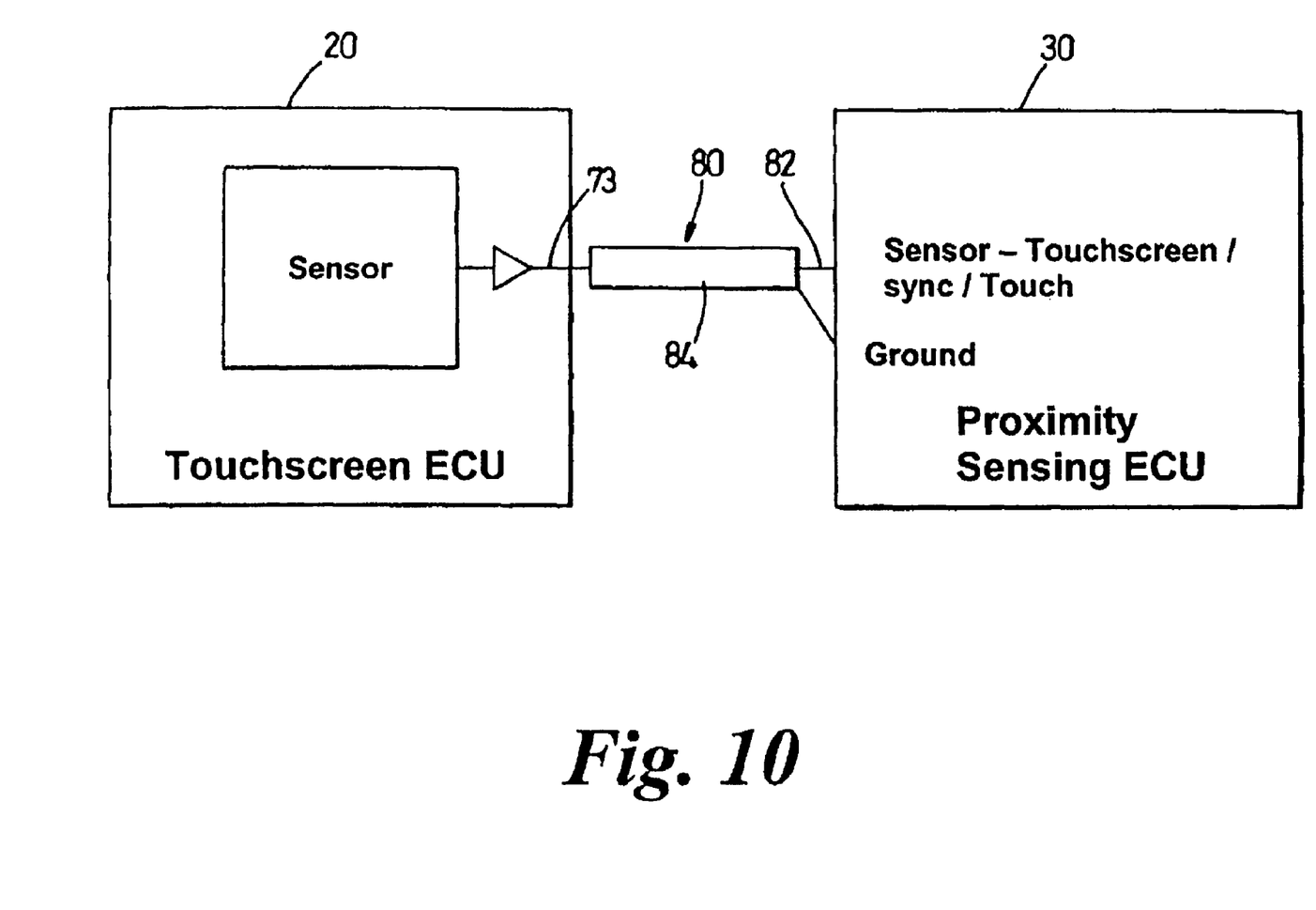
FIG. 10 is a diagram showing communication between two control units of the system of FIG. 1.

Referring to FIG. 10, the touch screen controller 20 and the proximity sensing ECU 30 are connected to each other by a coaxial cable 80, the inner 82 of which transmits signals from the touch screen controller 20 to the proximity sensing controller 30, and the outer 84 of which is connected to ground. This coaxial cable is used to transmit the detected proximity sensing signal from the front layer 50 of the touch screen to the proximity sensing controller 30, and also to transmit a synchronisation signal, so that the proximity sensing controller can determine when the signal on the coaxial cable is the proximity sensing signal, and when it is not. It is also used by the touch screen controller 20 to indicate to the proximity sensing ECU 30 when the touch screen 14 is being touched. The touch screen controller 20 alternates between a touch screen mode, in which it detects the presence or absence of a touch on the touch screen, and the position of any touch, and a proximity sensing mode, in which it receives the proximity sensing signal and transmits it on to the proximity sensing controller 30. At power up the proximity sensing controller synchronises itself to the synchronisation signal, and remains in synchronisation thereafter.

Figure 11:
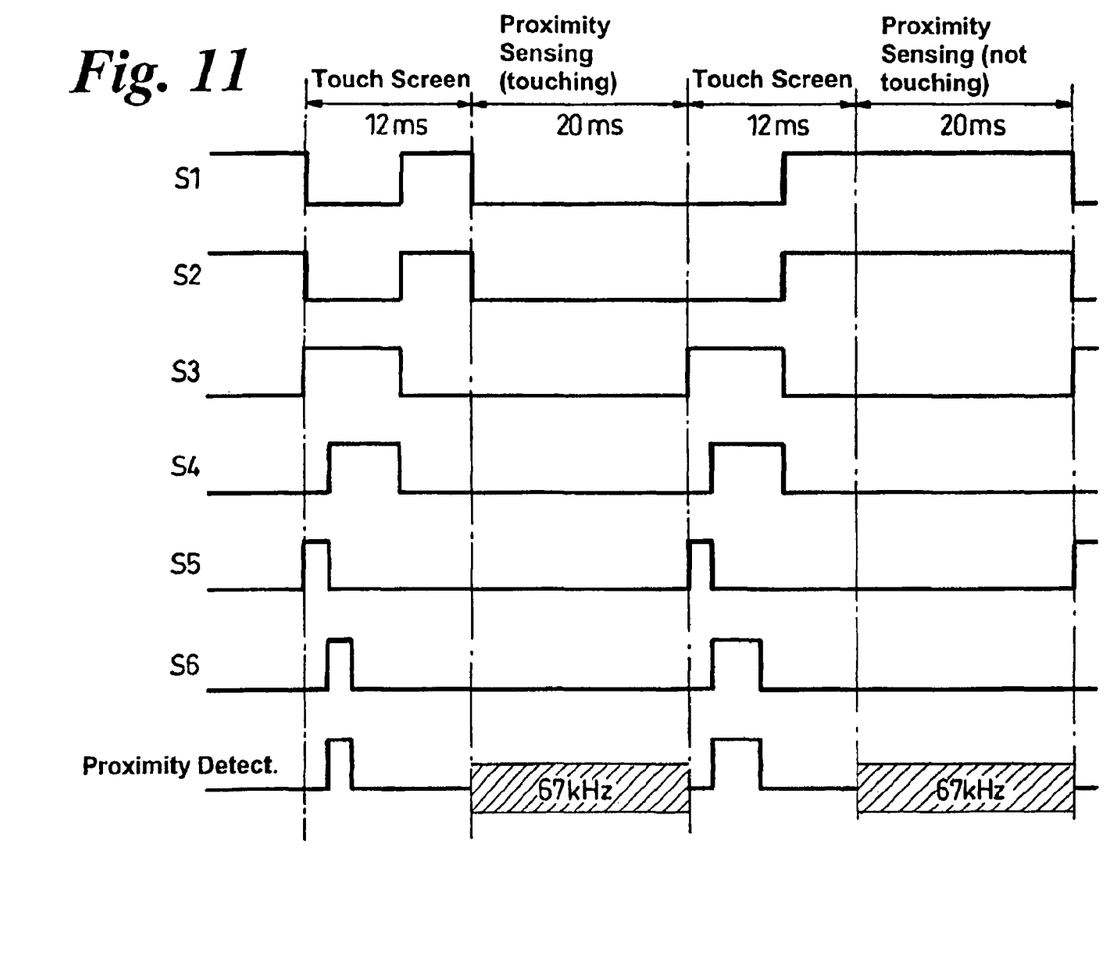
FIG. 11 is a timing diagram showing the signals at various points in the system of FIG. 1 during operation.

Referring to FIG. 1, the touch screen controller 20 in this example operates on the basis of a cycle time of 32 ms, made up of a touch screen operation cycle of 12 ms and a proximity detection cycle of 20 ms. These cycle times could obviously vary. During this cycle each of the switches S1 to S6 can be opened and closed by applying a control signal to them, as shown in FIG. 11, the control signal being high to close the switch and low to open it. The proximity sensing signal on the coaxial cable is shown at the bottom of FIG. 11.

At the beginning of the touch screen cycle, switches S3 and S5 are closed for a predetermined time, putting the switching circuit into the touch detection state, and the signals from the two rear layer contact wires 62, 64 are monitored by the proximity sensing controller 20 to determine whether the screen is being touched. At the end of this time switch S6 is closed to produce a rising edge in the signal on the coaxial cable 80. This is used by the proximity sensing controller for synchronisation. The switch S6 is then opened again after either a first, short period, if touching of the touch screen has been detected, or a second longer period, of touching of the touch screen has not been detected. The length of the $V_{BATT}$ synchronisation pulse therefore indicates to the proximity sensing controller 30 whether the screen 14 is being touched or not. This enables the proximity sensing controller to adjust its sensitivity to take account of the fact that the proximity sensing signal will be received much more strongly when the screen 14 is being touched. It also enables the proximity sensing controller 30 to modify its inputs to the system controller 12, if appropriate, when the screen 14 is being touched.

After the end of the synchronisation pulse, the remainder of the 12 ms touch screen cycle is taken up by the touch screen controller 20 determining the position of the point at which the touch screen is being touched. This is carried out in a conventional manner by putting the touch screen switching circuit into the x-coordinate and y-coordinate sensing states described above. During this part of the cycle the signal on the coaxial cable 80 will vary in a number of ways, and the proximity sensing controller is arranged to ignore it. The signal will never rise above 5V, apart from during the synchronisation pulse, because the power supply to the buffer 72 is at 5V, i.e. lower than the voltage of the synchronisation signal. This ensures that the synchronisation signal can be distinguished from all other signals on the coaxial cable 80.

Then at the beginning of the proximity sensing cycle, switches S3 and S4 are opened so that the potential on the front layer 50 can vary with the proximity sensing signal transmitted through the user, and switches S5 and S6 are kept open. Switches S1 and S2 are closed if the screen 14 is not being touched, as in the second cycle shown, so that the rear layer 52 can act as a shield as described above. This is the first proximity sensing state described above. If the screen 14 is being touched, switches S1 and S2 are opened during the proximity sensing cycle, as in the first cycle shown. As described above, this prevents the voltage on the rear layer 52 being altered in a way what would interfere with the proximity sensing signal as detected on the front layer 50. During the proximity sensing cycle, the proximity sensing controller 30 transmits the proximity sensing signal through each of the driver and passenger seat antennae 26, 28, alternately and monitors the received signal via the coaxial cable 80 to determine the proximity of the driver or passenger's hand to the screen 14, and to determine whether it is the driver's or the passenger's hand which is being detected.

For effective operation, the input buffer 72 needs to have a high DC input impedance, preferably at least 10 k.OMEGA. This is to ensure that the touch detection can work correctly. It also needs to be able to amplify the proximity sensing signal, which in this embodiment is around 100 nA peak to peak, so that it can be detected by the proximity sensing controller 30. The buffer 72 also needs to have a low input impedance at the frequency of the proximity sensing signal, 67 kHz, preferably lower than the reactance between the touch screen layers 50, 52, to prevent the sensitivity of the sensing system from being reduced by the capacitance of the touch screen 14. For example, for a 10 nF touch screen, the input impedance needs to be less than 230.OMEGA. at 67 kHz.

Figure 12:
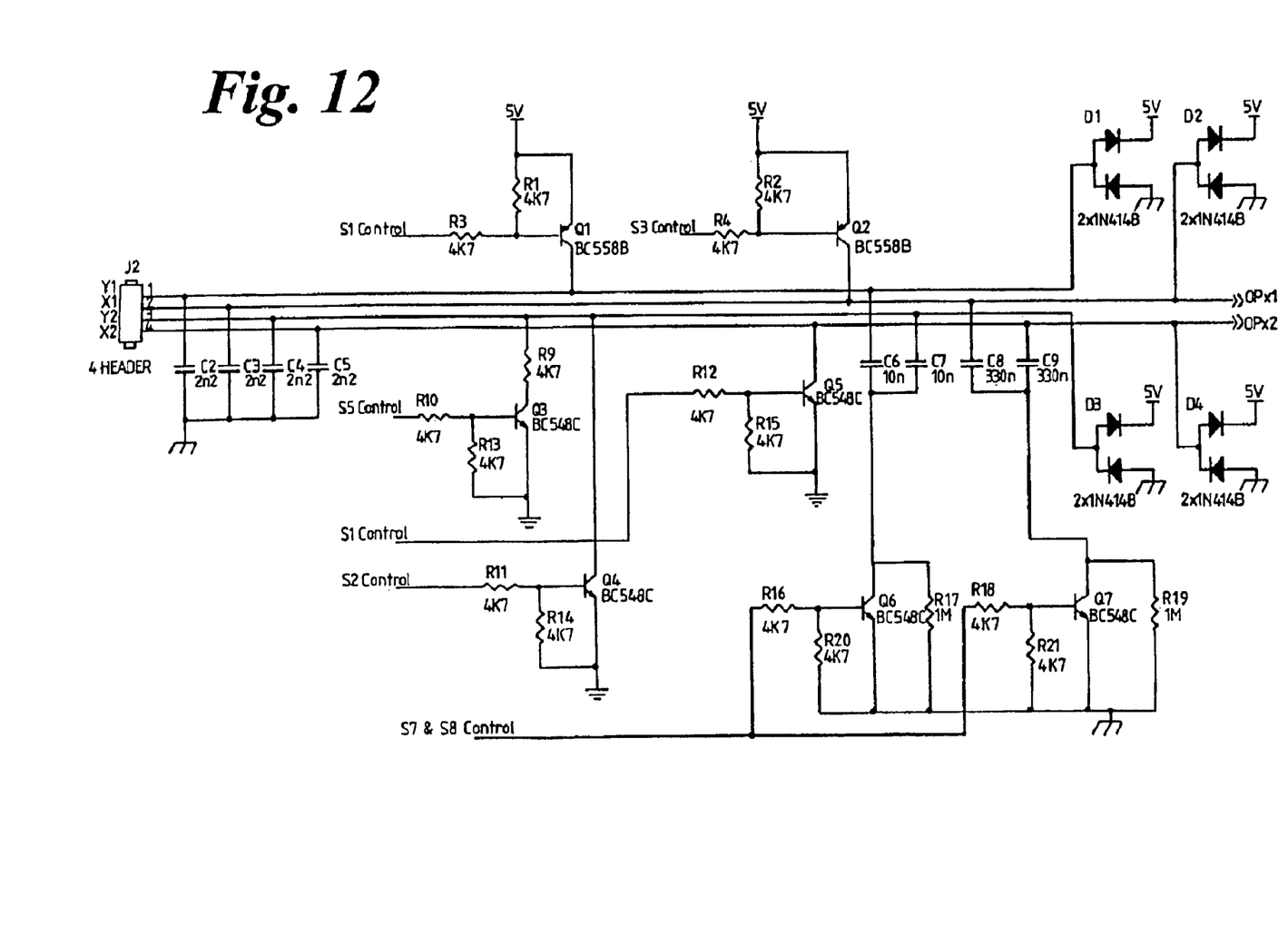
FIG. 12 is circuit diagram showing details of a touch screen switching and protection circuit of the system of FIG. 1.

An example of a suitable switching and protection circuit for the touch screen 14 is shown in FIG. 12. The two front touch screen layer contact wires 54, 56 are connected to two inputs X1, X2 of a header J2, and the two rear layer contact wires 62, 64 to two further inputs Y1, Y2. Capacitors C2 to C5 provide EMC suppression. Capacitors C6 to C9 are switched into the circuit during touch screen operation, to provide further EMC suppression during proximity sensing, by transistors Q6 and Q7 which implement switches S7 and S8. Transistors Q1, Q2, Q3, Q4, and Q5 implement switches S1, S3, S5, S2 and S4 respectively. Diodes D1 to D4 provide electrostatic discharge (ESD) protection. The outputs on X1 and X2, from the front layer left and right contact wires 54, 56, are connected to the buffer circuit 72, which is implemented as shown in FIG. 13.

Figures 13, 14:
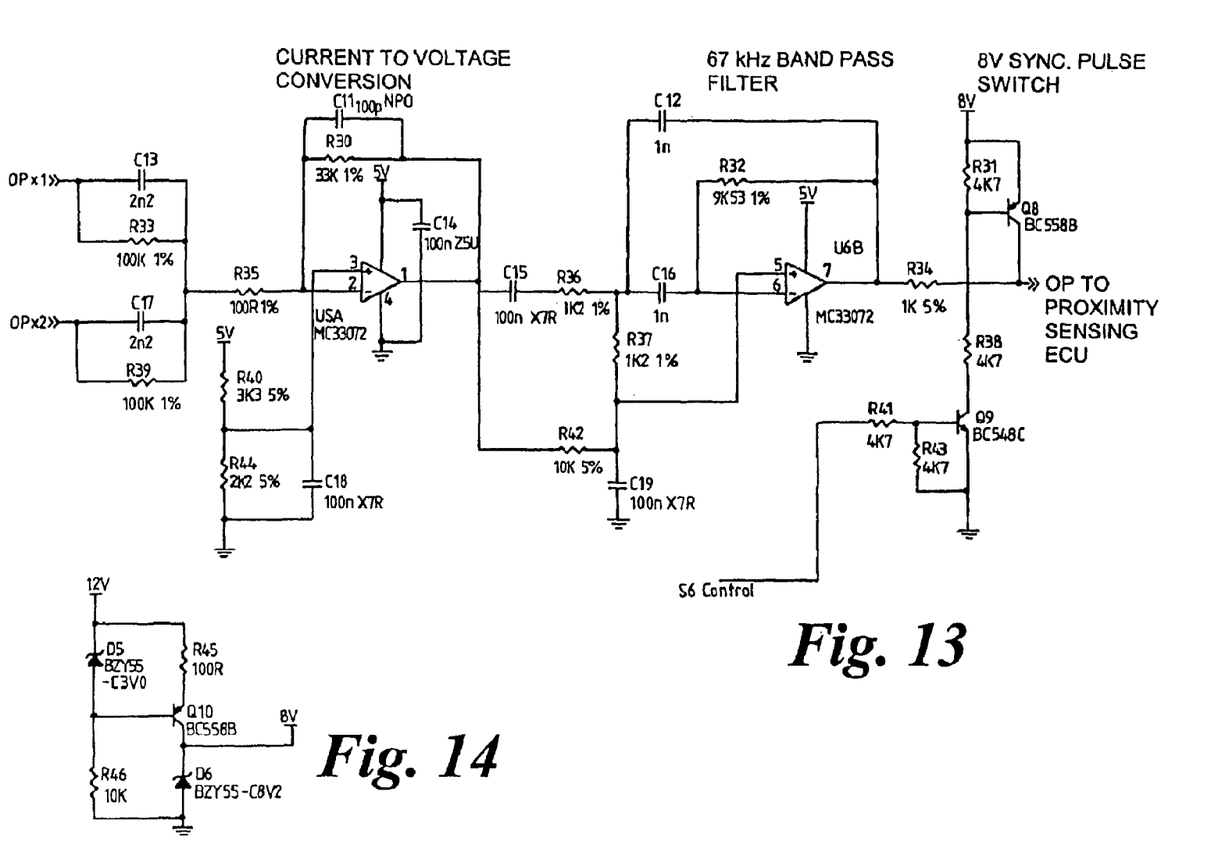
FIG. 13 is circuit diagram showing details of a touch screen input buffer circuit of the system of FIG. 1.
FIG. 14 is circuit diagram showing a circuit for generating a reference signal in the system of FIG. 1.

Referring to FIG. 13, in an example of a suitable buffer circuit, C13 and C17 couple the AC component of the proximity sensing signals from the two front layer contact wires to the virtual ground input of op amp U6A. R35 sets the AC input impedance, and R33 and R39 set the DC input impedance. R40, R44 and C18 provide a bias voltage to the circuit of 2V. The ratios of R30 to R33 and R30 to R39 respectively define the DC gain to the signals from each of the front layer contact wires 54, 56. R30 and C11 define the sensitivity to AC current.

Op amp U6B and its surrounding components form a 67 kHz band pass filter. Transistors Q8 and Q9 implement switch S6, to pull the output of the buffer up to V.sub.BATT, controlled using a 5V signal.

As shown in FIG. 14, the V.sub.BATT reference signal is provided from a 12V input by zener diodes D5 and D6, resistors R45 and R46 and transistor Q10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A detection system for use with a touch screen having first and second conductive layers operable to be brought together by touching of a user, the system comprising:
   a proximity sensing controller operable to determine a distance between a part of the user and the touch screen prior to the part touching the first conductive layer based on a strength of a proximity signal emanating from the part of the user and received by the first conductive layer; and
   a touch screen controller operable to detect a contact position where the part touches the first conductive layer as a function of a first electrical potential occurring prior to the part touching the first conductive layer and at least one of a second and a third electrical potential occurring after the part touches the first conductive layer with enough force to press the first conductive layer against the second conductive layer.

2. The system of claim 1 wherein the touch screen controller determines an x-coordinate of the contact position based on the second electrical potential as measured across the second conductive layer.

3. The system of claim 2 wherein, while determining the x-coordinate, one side of the first conductive layer is connected to a positive power supply and an opposite side of the first conductive layer is connected to ground, and one edge of the second conductive layer is disconnected from the positive power supply and an opposite edge of the second conductive layer is disconnected from ground.

4. The system of claim 1 wherein the touch screen controller determines a y-coordinate of the contact position based on the third electrical potential as measured across the first conductive layer.

5. The system of claim 4 wherein, while determining the y-coordinate, one side of the first conductive layer is disconnected from a positive power supply and an opposite side of the first conductive layer is disconnected from ground, and one edge of the second conductive layer is connected to the positive power supply and an opposite edge of the second conductive layer is connected to ground.

6. The system of claim 1 wherein the proximity sensing controller receives the proximity signal from the first conductive layer while the part presses the first conductive layer against the second conductive layer.

7. The system of claim 6 wherein a top edge of the second conductive layer is connected to a positive power source and a bottom edge of the second conductive layer is connected to ground for at least a substantial portion of a period of time during which the touch screen controller determines the contact position.

8. The system of claim 7 wherein the top edge is disconnected from the positive power source and the bottom edge is disconnected from ground during substantially all of a period of time during which the proximity sensing controller determines the distance.

9. The system of claim 1 wherein the proximity sensing signal passes from an antenna located within a seat occupied by the user and through a body of the user to the part prior to receipt by the first conductive layer.

10. The system of claim 1 wherein at least one of the at least one of the second and third electrical potentials varies depending on a contact point where the part presses the first and second layers together such that no contact point is at the same electrical potential as another contact point.

11. The system of claim 1 wherein the proximity sensing controller facilitates display of a first plurality of buttons within a heads-up display (HUD) when the distance is less than a threshold and facilitates removal of the HUD when the distance is greater than a threshold.

12. The system of claim 11 wherein the touch screen controller facilitates display of a second plurality of buttons within the HUD after determining selection one of the first plurality of buttons, the selection of the one of the first plurality of buttons being based on the contact positioned determined after the first conductive layers is pressed against the second conductive layer.

13. The system of claim 12 wherein the touch screen controller determines selection of one of the second plurality of buttons after the force causing the first conductive layer to press against the second conductive layer is removed and replaced with force sufficient to cause the first conductive layer to again press against the first conductive layer.

14. The system of claim 12 wherein the HUD is shown on a windshield positioned above the touch screen.

15. A touch screen comprising:
   first and second layers operable to be brought together by touching of a user;
   a first switch operable to connected and disconnect one edge of the first layer to a power source;
   a second switch operable to connected and disconnect one edge of the first layer to ground;
   a third switch operable to connected and disconnect one edge of the second layer to a power source;
   a fourth switch operable to connected and disconnect one edge of the second layer to ground;
   a touch screen controller operable to measure electrical potential between each of the first, second, third, and fourth edges and the corresponding one of the first, second, third, and fourth switches; and
   wherein the touch screen controller determines a contact position where the first and second layers are brought together as a function of the measured electrical potentials.

16. The system of claim 15 wherein the touch screen controller determines an x-coordinate of the contact position based on electrical potentials measured while the first and second switches respectively connect the first layer to the power source and ground and the third and fourth switches respectively disconnect the second layer from the power source and ground.

17. The system of claim 15 wherein the touch screen controller determines an y-coordinate of the contact position based on electrical potentials measured while the first and second switches respectively disconnect the first layer from the power source and ground and the third and fourth switches respectively connect the second layer to the power source and ground.

18. The system of claim 15 further comprising a proximity sensing controller operable to determine a distance between a part of the user and the touch screen based on a strength of a proximity signal measured at the first layer, the proximity signaling being passed through the part of the user from an antenna included within a seat occupied by the user while the third and fourth switches respectively disconnect the second conductive layer from the power source and ground.

19. A method of controlling a heads-up display (HUD) where information displayed within the HUD is controlled according to user interaction with a touch screen having spaced apart first and second conductive layers, the method comprising:
   operating in a proximity sensing mode where a distance of a part of the user to the touch screen is determined based on a signal transmitted from the part to the first conductive layer;

operating in a touch screen mode wherein a contact point at which the part presses the first conductive layer against the second conductive layer is determined, the contact point defined according to an x-coordinate and a y-coordinate, the x-coordinate being determine based on a first electrical potential at one of the first and the second conductive layers and the y-coordinate being determined based on a second electrical potential at the other one of the first and second conductive layers;

selectively alternating between the proximity sensing mode and the touch screen mode while the part is within the distance to the touch screen; and operating exclusively according to the proximity sensing mode while the part is beyond the distance to the touch screen.

20. The method of claim 19 further comprising:

instructing display of a heads-up display (HUD) when the part is within the distance to the touch screen; and instructing removal of the HUD when the part is beyond the distance to the touch screen.

* * * * *